United States Patent [19]
Chlupsa

[11] Patent Number: 4,773,656
[45] Date of Patent: Sep. 27, 1988

[54] CLAMPING SHAFT

[76] Inventor: Otto Chlupsa, GoethestraBe 52, D-6070 Langen, Fed. Rep. of Germany

[21] Appl. No.: 44,651

[22] Filed: May 1, 1987

[30] Foreign Application Priority Data

Dec. 27, 1986 [DE] Fed. Rep. of Germany ... 8634752[U]

[51] Int. Cl.$^4$ ................ B23B 31/16; B65H 72/24
[52] U.S. Cl. ............................... 279/2 A; 242/72 B; 279/2 R
[58] Field of Search ............ 409/232, 234; 242/72 B; 279/2 R, 2 A; 269/72.1

[56] References Cited

U.S. PATENT DOCUMENTS

| | | | |
|---|---|---|---|
| 2,850,287 | 9/1958 | Jackson | 279/2 R |
| 3,599,997 | 8/1971 | Oliver | 279/2 R |
| 4,285,528 | 8/1981 | Neamtu | 82/44 X |
| 4,473,195 | 9/1984 | Marin | 242/72 B |

FOREIGN PATENT DOCUMENTS

| | | | |
|---|---|---|---|
| 494288 | 9/1919 | France | 279/2 |
| 703590 | 3/1941 | Fed. Rep. of Germany | 279/2 |
| 1140428 | 11/1962 | Fed. Rep. of Germany | 409/234 |
| 302986 | 11/1954 | Switzerland | 279/2 |

Primary Examiner—William R. Briggs
Attorney, Agent, or Firm—Bill B. Berryhill

[57] ABSTRACT

A clamping shaft for clamping a surrounding socket component comprising: a tubular shaft characterized by a tubular body provided with radially spaced slots through which expansion wedges may be extended and retracted for engagement with and disengagement from, respectively, the socket component. A connecting rod, concentrically supported within the shaft, is provided with sloping surfaces thereon engageable with corresponding sloping surfaces on the expansion wedges for effecting movement of the expansion wedges in response to axial movement of the connecting rod. Shifting apparatus carried by the shaft effects axial movement of the connecting rod.

5 Claims, 1 Drawing Sheet

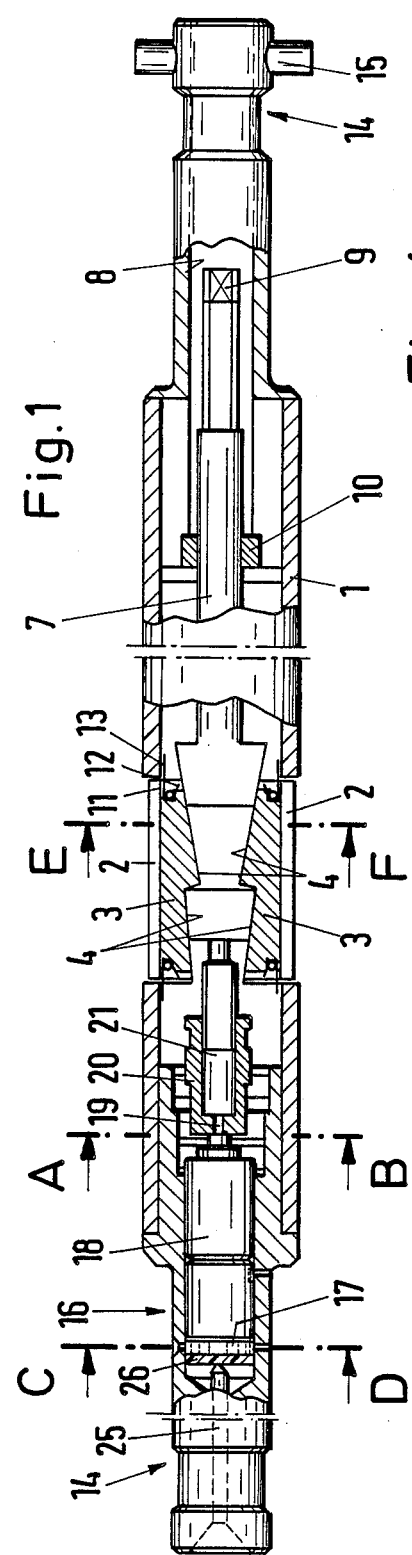

CLAMPING SHAFT

BACKGROUND OF THE INVENTION

1. Field of the Invention

The present invention pertains to clamping devices. More specifically, it pertains to devices for clamping of sockets or similar socket-like components of various diameters.

2. Description of the Prior Art

Various devices are known in the prior art for clamping of a socket or socket-like component. In one type, expansible hoses are blown up, expanding the shaft for coupling with a surrounding socket. With this type of clamping shaft, problems frequently arise with sealing of the hoses.

Mechanical clamping shafts are also known which utilize expansion wedges in which the force required for expanding the wedges is afforded by a screw tool which is put onto a polyhedral which then, by a thread, shifts a connecting rod in one or the other direction. This actuation actually has the advantage that it is independent of outer energy sources as electric current or compressed air; however, in practice, problems might arise because the required clamping force must be afforded manually over the screw tool. If one does not use a very long screw tool, because of the greater lever arm which is impractible, a person often cannot afford the required clamping force, the more so as losses in transmitting the force are evident between the screw tool and the connecting rod as well as the expansion wedges.

Such mechanical clamping shafts also exist in which the drive is afforded by a pistol-cylinder-unit which is driven by compressed air. In these, the piston is frictionally connected with connecting rod and for shifting same. However, it is also problematical to afford the required clamping force, particularly with clamping shafts of smaller diameters, for instance in the order of 30 mm. The plane at disposal for the piston often is too small to afford sufficient clamping force expecially since the pressure of the compressed air also is limited, and in the workshops where such clamping shafts are being used one will not put at disposal for these clamping shafts a particular source of compressed air.

SUMMARY OF THE PRESENT INVENTION

The present invention is a clamping shaft with a tube-like shaft body having a trunnion at its both ends and which is provided with expansion wedges supported in the shaft body which at an axial shifting of a connecting rod pass radially through respective slot-shaped openings in the shaft body, thereby clamping a socket shifted over the clamping shaft. The expansion wedges are provided with slopes which engage slopes of a connecting rod. Spring elements are proposed which move, at a shifting of the connecting rod in the opposite direction, the expansion wedges into their retracted original position. A pneumatic drive is proposed for the shifting of the connecting rod.

The present invention thus avoids some of the disadvantages of the prior art. It is its object to propose a mechanical clamping shaft with the features mentioned, the clamping force of which will suffice all present requirements.

For solving this object, the invention is characterized in that the drive is provided by a motor actuated by compressed air, the rotary motion of which shifts the connecting rod by a reduction of speed. The motor is mounted into the clamping shaft at one of its ends, wherein in the shaft body is in a plane of a turbine wheel of the pneumatic motor. Spaced angularly to each other are two inlets for compressed air as well as an outlet for compressed air.

The pneumatic motor is actuated by compressed air anywhere at hand in the workshop. A conventional pneumatic pistol may be applied manually to one of the inlets for compressed air in the groove body so that the compressed air when actuating the pneumatic pistol comes through the inlet to the turbine wheel of the air motor, rotating the turbine wheel with very high speed. This high rotational speed then subsequently is sufficiently reduced whereby the required great force is afforded which is then transmitted over the connecting rod in a conventional way to the expansion wedges which are then shifted themselves in radial direction outwardly or inwardly, respectively. The compressed air leaves the shaft body through the outlet for compressed air. When using one of the inlets for compressed air the turbine wheel is rotating in one rotating direction and when using the other of the inlets for compressed air, it is rotating in the other direction. To one rotating direction the expanding of the clamping shaft is assigned, while to the other rotating direction the retracting of the clamping shaft and the expansion wedges, respectively, is assigned. By simple choice of one of the inlets for the compressed air one can determine the actuating direction of the clamping shaft.

If the clamping shaft according to the invention shall be employed at a place where no compressed air is at disposal it is preferred that at the other end of the clamping shaft a polyhedral connected to the connecting rod is provided which can be actuated by a screw tool as is known per se.

Further objects and advantages of the invention will be understood from the description which follows in conjunction with the accompanying drawings.

BRIEF DESCRIPTION OF THE DRAWINGS

FIG. 1 is a partial sectional view of the clamping shaft according to a preferred embodiment of the invention;

FIG. 2 is a sectional view of the clamping shaft of the present invention taken along line A-B of FIG. 1;

FIG. 3 is a sectional view of the clamping shaft taken along line C-D of FIG. 1; and FIG. 4 is a sectional view of the clamping shaft taken along line E-F of FIG. 1.

DESCRIPTION OF A PREFERRED EMBODIMENT

Referring first to FIG. 1, the clamping shaft of the present invention consists of a tube-like shaft body 1 in which, distributed over its length and spaced angularly and uniformly from each other, are several slotshaped openings 2 (See also FIG. 4). In the area of these openings, expansion wedges 3 are provided preferably having several slopes 4 after another. The wedges may be extended and retracted, respectively, in radial directions (See double arrow 5). The outer edges of the wedges are V-shaped in profile as shown in FIG. 4 so that the wedges can better fasten themselves in a socket 6 which shall be clamped with the clamping shaft according to the invention.

A connecting rod 7 is provided which is shiftable in axial directions. The connecting rod 7 is also provided with slopes corresponding to the slopes 4 of the wedges 3.

At the right end of the clamping shaft a polyhedral 9 for shifting of the connecting rod 7 is proposed which is accessible through a bore 8 and which can be actuated through the bore 8 from outside by a suitable screw tool. When actuated, the connecting rod 7 is turned and functions with a thread in a thread bushing 10 and thereby is shifted in an axial direction to the right or to the left whereby, as described, the shaft is clamped or retracted.

For the return movement of the expansion wedges 3, springs 11 are provided which are self-supported by shanks 12 at the inner side of the shaft body 1 and engage with the other shank 13 respective recesses of the wedges 3.

FIG. 1 also shows that both ends of the clamping shaft are provided with trunnions 14 having a reduced diameter. A coupling pin 15 is inserted transversely into one of the trunnions and serves for the transmission of torque in the operation of the clamping shaft.

According to a preferred embodiment of the invention, a pneumatic motor 16 is inserted into one end of the clamping shaft. The motor 16 provided with a turbine wheel 17 the rotating motion of which is suitably reduced by a reduction gear indicated at 18. A deviation shaft 19 of the motor 16 is indented with a thread bushing 20 (see also FIG. 2) so that on rotation of the shaft 19 and end 21 having an outer thread of the connecting rod 7 is shifted in an axial direction, whereby also, as already described, the clamping shaft is expanded and retracted, respectively.

FIG. 3 shows that for actuating of the turbine wheel 17 of the pneumatic motor 16 a first inlet opening 22 and a second inlet opening 23 as well as an outlet opening 24 is provided. The inlet openings widen to the outside for an air-tight attachment of a flexible orifice of a pneumatic pistol. The opening 22 serves for the left-hand rotation of the motor 16 and the opening 23 for the right-hand rotation of the motor 16 so that by the opening 22 the clamping shaft is loosened and by the opening 23 the clamping shaft is clamped.

At the left-hand of FIG. 1 an assembly bore 25 is shown as well as a rubber disc 26 at the left end of motor 16. The motor 16 with its reduction gear 18, and, in respect to the gear, subsequently added assembly elements have a selflocking effect in such a way that at stand still of the motor the wedges 3 cannot be inadvertantly pushed into the inside of the clamping shaft.

Drives 16, 9 are provided at each end of the clamping shaft and therefore the clamping shaft can be alternatively actuated with compressed air or manually whichever is most advantageous for many cases of application.

The drive shaft 19 may also be provided as cylindrical plug (without spline) with a mating groove and mating spring. This embodiment results in a particularly large power transmission.

Althouth a single embodiment of the invention has been described herein, many variations can be made without departing from the spirit of the invention. Accordingly, it is intended that the scope of the invention be limited only by the claims which follow.

I claim:

1. A clamping shaft for clamping a surrounding socket or socket-like component comprising:
    a shaft characterized by a tubular body at the opposite ends of which are trunnions to permit rotation of said shaft, said tubular body being provided with radially spaced longitudinal slots through which physical communication is established between the exterior and interior of said tubular body;
    expansion wedges supported within said tubular body for movement between retracted positions, within said tubular body, and extended positions in which said wedges extend through said slots for clamping engagement with said surrounding socket component;
    spring means engageable with said expansion wedges biasing said wedges toward said retracted positions;
    a connecting rod concentrically supported within said shaft and having sloping surfaces thereon engageable with corresponding sloping surfaces on said expansion wedges for effecting said movement of said expansion wedges in response to axial movement of said connecting rod; and
    means carried by said shaft for effecting said axial movement of said connecting rod including a pneumatic motor to which compressed air may be supplied for rotation thereof and translating means connecting said pneumatic motor and said connecting rod, said translating means converting rotational movement of said pneumatic motor to axial movement of said connecting rod.

2. A clamping shaft as set forth in claim 1 in which said pneumatic motor comprises a turbine wheel by which rotary motion is imparted to said pneumatic motor, said shaft being provided with first and second inlets by which said compressed air may be supplied to said turbine wheel for rotation and an outlet through which said compressed air may exit from said turbine wheel.

3. A clamping shaft as set forth in claim 2 in which said turbine wheel is rotatable in one direction when compressed air is supplied through said first inlet and in the opposite direction when compressed air is supplied through said second inlet, said connecting rod moving in a first axial direction in response to said turbine wheel rotating in said first direction to effect movement of said expansion wedges to said extended positions and in a second and opposite axial direction in response to said turbine wheel rotating in said second direction to effect movement of said expansion wedges to said retracted positions.

4. A clamping shaft as set forth in claim 3 including spring means engageable with said expansion wedges biasing said wedges toward said retracted positions.

5. A clamping shaft as set forth in claim 1 in which said means for effecting said axial movement of said connecting rod comprises a thread bushing carried by said shaft having internal threads engaging external threads provided on the exterior of said connecting rod, one end of said connecting rod having a polyhedral configuration engageable with a tool for rotation thereof, said rotation being translated through said thread bushing to axial movement of said connecting rod independent of said pneumatic motor.

* * * * *